US009177726B2

(12) United States Patent
Morita et al.

(10) Patent No.: US 9,177,726 B2
(45) Date of Patent: Nov. 3, 2015

(54) MULTILAYER CERAMIC CAPACITOR

(71) Applicant: TAIYO YUDEN CO., LTD., Taito-ku, Tokyo (JP)

(72) Inventors: Koichiro Morita, Takasaki (JP); Katsuya Taniguchi, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 217 days.

(21) Appl. No.: 14/066,465

(22) Filed: Oct. 29, 2013

(65) Prior Publication Data

US 2014/0211367 A1  Jul. 31, 2014

(30) Foreign Application Priority Data

Jan. 31, 2013 (JP) ................. 2013-017078

(51) Int. Cl.
*H01G 4/12* (2006.01)
*H01G 4/30* (2006.01)

(52) U.S. Cl.
CPC ............... *H01G 4/30* (2013.01); *H01G 4/1209* (2013.01); *H01G 4/12* (2013.01)

(58) Field of Classification Search
CPC .......... H01G 4/12; H01G 4/1209; H01G 4/30
USPC .................. 361/301.4, 321.2, 321.3
See application file for complete search history.

(56) References Cited

U.S. PATENT DOCUMENTS

| 6,205,014 | B1 | 3/2001 | Inomata et al. |
| 7,089,659 | B2* | 8/2006 | Iwaida et al. ................. 29/830 |
| 8,797,713 | B2* | 8/2014 | Yao ............................ 361/321.4 |
| 9,076,596 | B2* | 7/2015 | Yoon et al. ............................. 1/1 |
| 9,076,600 | B2* | 7/2015 | Yano et al. ............................. 1/1 |
| 2007/0135294 | A1 | 6/2007 | Hiramatsu et al. |
| 2011/0180413 | A1* | 7/2011 | Whitaker et al. ............. 205/170 |

(Continued)

FOREIGN PATENT DOCUMENTS

| JP | 05129152 A * | 5/1993 | ............... H01G 4/12 |
| JP | H11-317322 A | 11/1999 | |

(Continued)

OTHER PUBLICATIONS

Notification of Reasons for Refusal issued by the Japanese Patent Office, mailed Sep. 24, 2013, for Japanese counterpart application No. 2013-017078.

*Primary Examiner* — Jeremy C Norris
*Assistant Examiner* — Nathan Milakovich
(74) *Attorney, Agent, or Firm* — Law Office of Katsuhiro Arai

(57) ABSTRACT

With a multilayer ceramic capacitor whose average grain size of the dielectric grains present at the outermost layer position $P_1$ in the laminate is given by $D_1$, average grain size of the dielectric grains present at the center position $P_2$ in the laminate is given by $D_2$, and average grain size of the dielectric grains present at the 25%-penetrated position $P_3$ which is a position penetrated into the laminate by 25% is given by $D_3$, growth of the dielectric grains occurring as a result of sintering is partially suppressed in such a way that the relationships of average grain sizes $D_1$, $D_2$, and $D_3$ satisfy the conditions of $1.5 \times D_1 < D_3$ and $1.2 \times D_2 < D_3$. This way, a sufficient CR product can be obtained even with a dielectric thickness of 1 μm or less.

14 Claims, 5 Drawing Sheets

(56) References Cited

U.S. PATENT DOCUMENTS

| | | | |
|---|---|---|---|
| 2012/0154978 A1* | 6/2012 | Kim | 361/321.2 |
| 2012/0262840 A1 | 10/2012 | Koizumi | |
| 2013/0301185 A1* | 11/2013 | Lee et al. | 361/301.4 |
| 2014/0071586 A1* | 3/2014 | Park et al. | 361/301.4 |
| 2014/0085769 A1* | 3/2014 | Ueda et al. | 361/301.4 |
| 2014/0254063 A1* | 9/2014 | Konishi et al. | 361/301.4 |

FOREIGN PATENT DOCUMENTS

| | | |
|---|---|---|
| JP | 2001-338828 A | 12/2001 |
| JP | 2007-266223 A | 10/2007 |
| JP | 2010-180124 A | 8/2010 |
| JP | 2010-212503 A | 9/2010 |
| JP | 2012-227260 A | 11/2012 |

* cited by examiner

MULTILAYER CERAMIC CAPACITOR

FIELD OF THE INVENTION

The present invention relates to a multilayer ceramic capacitor. Specifically, it relates to a multilayer ceramic capacitor offering an improved CR product being a product of capacitance and insulation resistance, and method of manufacturing such multilayer ceramic capacitor.

DESCRIPTION OF THE RELATED ART

As mobile phones and other digital electronic devices become increasingly smaller and thinner, the need for smaller, larger-capacity chips required on multilayer ceramic capacitors (MLCCs) mounted on the electronic circuit boards of these devices is increasing every year. To increase the capacitance of a small multilayer ceramic capacitor, it is necessary to make its dielectric layer thinner and laminate a multiple number of such dielectric layers at high density. If the thickness of the dielectric layer is reduced to the micron order or even less, however, the dielectric layer will approach the so-called one-layer-one grain microstructure where the thickness of the dielectric layer is roughly the same as the grain size.

A dielectric layer having the one-layer-one-grain structure has less grain boundaries between dielectric grains, which gives rise to concerns for drop in insulation resistance, drop in voltage endurance, and worsening of other properties that contribute to the reliability of the multilayer ceramic capacitor. Additionally, if the dielectric grains grow excessively as the ceramic capacitor is sintered, grain boundaries in the dielectric layer will also decrease and similar problems such as drop in insulation resistance will occur. In other words, securing enough capacitance by increasing the density of a multilayer ceramic capacitor is a trade-off relationship with its insulation resistance, and the CR product (product of capacitance and insulation resistance) is used as one indicator for comparing the quality characteristics of multilayer ceramic capacitors.

As for the prior art aimed at reducing the drop in CR product associated with the reduction of dielectric layer thickness, Patent Literature 1 discloses a dielectric laminate structure, for example, constituted by dielectric layers each containing 10 to 30 percent by volume of large-sized crystal grains of 0.4 µm or more in grain size as well as 50 to 70 percent by volume of small-sized grains of 0.25 µm or less in grain size.

Among the methods for simultaneously achieving enough capacitance as a result of growth of dielectric grains along with good insulation characteristics or reliability, methods to control the aspect ratio of the dielectric grain (such as the method described in Patent Literature 2), methods to control the one-layer-one-grain ratio (such as the method described in Patent Literature 3) and methods to increase the insulation property of the dielectric composition (such as the method described in Patent Literature 4) are proposed, for example.

BACKGROUND ART LITERATURES

[Patent Literature 1] Japanese Patent Laid-open No. 2001-338828
[Patent Literature 2] Japanese Patent Laid-open No. 2010-212503
[Patent Literature 3] Japanese Patent Laid-open No. Hei 11-317322
[Patent Literature 4] Japanese Patent Laid-open No. 2010-180124

SUMMARY

However, even with any such prior art, the CR product of the multilayer ceramic capacitor still has a maximum limit, meaning that the problem of sudden drop in insulation resistance that occurs when the capacitance is increased by reducing the layer thickness to a certain level or less (refer to FIG. 10, for example) cannot be solved.

The present invention was developed to solve this problem and an object of the present invention is to provide a multilayer ceramic capacitor offering an improved CR product compared to conventional multilayer ceramic capacitors and achieving a sufficient CR product even with a dielectric thickness of 1 µm or less, by suppressing grain growth in areas where the grains grow relatively quickly due to sintering.

To achieve the aforementioned object, the present invention provides a multilayer ceramic capacitor with a laminate constituted by dielectric layers alternately laminated with internal electrode layers, wherein such multilayer ceramic capacitor satisfies the conditions of $1.5 \times D_1 < D_3$ and $1.2 \times D_2 < D_3$ as the relationships of average grain sizes $D_1$, $D_2$ and $D_3$, where $D_1$ represents the average grain size of the dielectric grains present at the outermost layer position in the laminate in the laminating direction, $D_2$ represents the average grain size of the dielectric grains present at the center position in the laminate in the laminating direction, and $D_3$ represents the average grain size of the dielectric grains present at the intermediate position equidistant from the outermost layer position and center position in the laminate in the laminating direction. In some embodiments, "the average grain size of the dielectric grains present at the position" may be represented by the average grain size of randomly selected multiple dielectric grains observed in a given cross section of at least one dielectric layer substantially or nearly at the position, or the average grain size of all the dielectric grains observed in a randomly selected cross section of at least one dielectric layer substantially or nearly at the position.

Preferably the aforementioned multilayer ceramic capacitor further satisfies the condition of $1.5 \times D_2 < D_3$. In addition, preferably the relationship of average grain sizes $D_3$ and $D_4$ further satisfies the condition of $1.5 \times D_4 < D_3$, where $D_4$ represents the average grain size of the dielectric grains present at the outermost edge position in the laminate in the direction orthogonal to the laminating direction.

Preferably the aforementioned multilayer ceramic capacitor is such that the per-layer thickness of the dielectric layer is 0.8 µm, while the average grain size $D_1$ is 0.4 µm or less.

Preferably the aforementioned multilayer ceramic capacitor has a ceramic margin formed in a manner covering the outside of the laminate, with a grain growth suppressant that suppresses grain growth in the dielectric layer added to the margin.

Preferably the aforementioned multilayer ceramic capacitor has a grain growth suppressant that suppresses grain growth in the dielectric layer added to the reverse-pattern sheet provided to compensate for the height difference generating between the dielectric layer and internal electrode layer.

Preferably the aforementioned multilayer ceramic capacitor is such that the grain growth suppressant contains at least one type of element selected from the group that includes Mn, Mg, and rare earth elements.

Any discussion of problems and solutions involved in the related art has been included in this disclosure solely for the purposes of providing a context for the present invention, and should not be taken as an admission that any or all of the discussion were known at the time the invention was made.

According to the present invention, a sufficient CR product can be achieved with a multilayer ceramic capacitor for high-end devices requiring compact size and large capacity, even when the dielectric thickness is 1 μm or less.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

DESCRIPTION OF THE SYMBOLS

Figure 1:
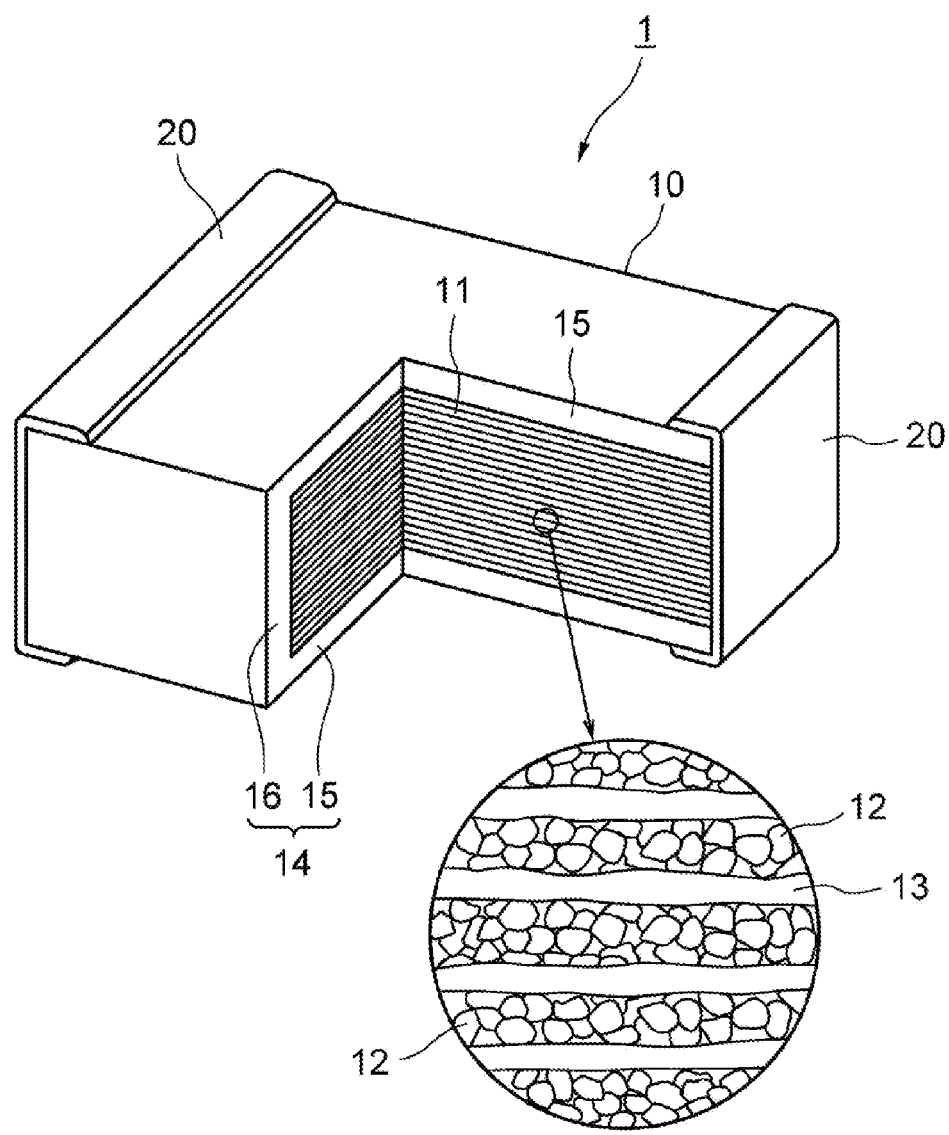
[FIG. 1] is a schematic perspective view showing the interior of the multilayer ceramic capacitor in an embodiment of the present invention, with a part of the capacitor cut out.

1 Multilayer ceramic capacitor (MLCC)
10 Sintered ceramic compact
11 Laminate (internal electrically active layer)
12 Dielectric layer
13 Internal electrode layer
14 Margin
15 Cover
16 Side margin
20 External electrode
22 Green sheet
23 Conductive paste film
24 Reverse-pattern sheet

DETAILED DESCRIPTION OF EMBODIMENTS

The multilayer ceramic capacitor in an embodiment of the present invention is explained below. FIG. 1 is a schematic perspective view showing the interior of a multilayer ceramic capacitor 1 with a part of the capacitor cut out. The multilayer ceramic capacitor 1 generally comprises a ceramic sintered compact 10 of specified chip size and shape (such as rectangular solid of 1.0×0.5×0.5 mm in size) and a pair of external electrodes 20 formed on both sides of the ceramic sintered compact 10. FIG. 1 shows a section view of the multilayer ceramic capacitor 1 of rectangular solid shape with one corner cut out. An enlarged view of a section of a laminate 11 is shown in the circle in FIG. 1.

The ceramic sintered compact 10 is made by sintering a primary component of $BaTiO_3$ (barium titanium), for example, and includes the laminate 11 (also called "internal electrically active layer") in its interior, which laminate is constituted by alternately laminating dielectric layers 12 and internal electrode layers 13. The internal electrically active layer generally refers to the roughly rectangular solid laminate 11 that contributes to the electric storage operation of the multilayer ceramic capacitor 1.

The laminate 11 has a high-density multilayer structure characterized by, for example, 0.8 μm or less in the thickness of one dielectric layer 12 sandwiched by two internal electrode layers 13, although the specific thickness varies depending on the capacitance, voltage endurance and other specifications required of the multilayer ceramic capacitor 1. Also, a margin 14 is formed in a manner covering the outside of the laminate 11.

As shown in detail in FIG. 1, the margin 14 includes covers 15 covering the top and bottom of the outermost layers of the laminate 11 in the laminating direction, as well as side margins 16 covering both sides of the outermost edges of the laminate 11 in the direction orthogonal to the laminating direction. As with the dielectric layer 12, the margin 14 is made of a sintered ceramic whose primary component is $BaTiO_3$, for example. The ceramic margin 14 covering the laminate 11 is formed for the purpose of protecting the dielectric layers 12, internal electrode layers 13, etc., from external humidity, contaminants and other pollutants, thereby preventing the laminate 11 from deteriorating over time.

Figure 2:
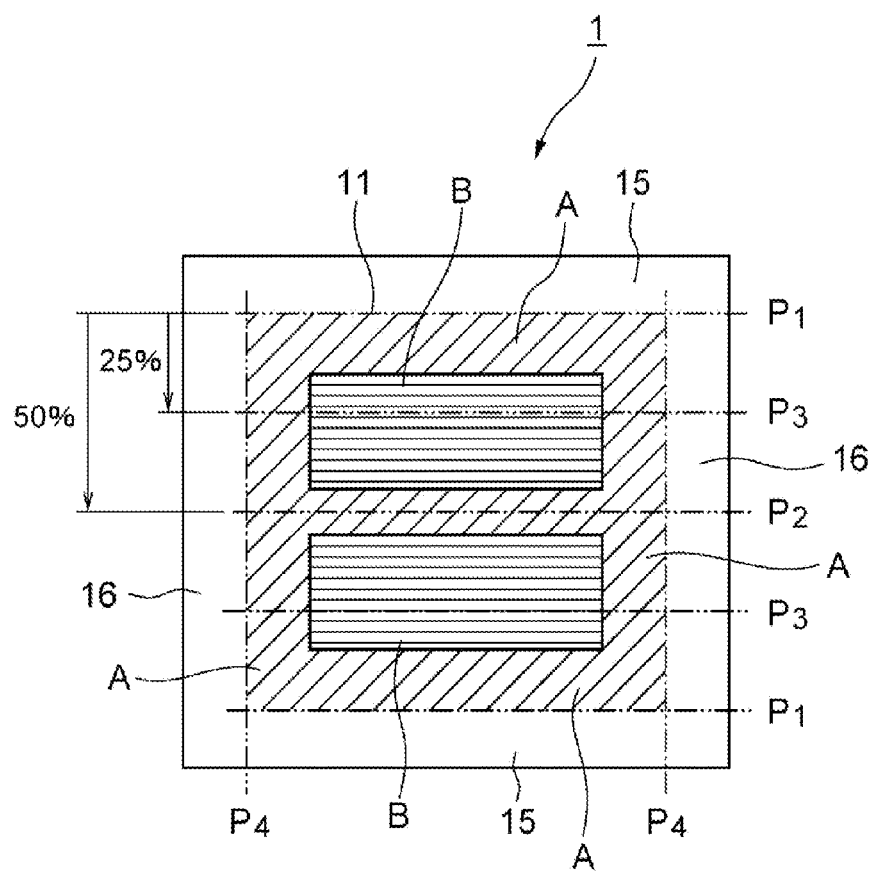
[FIG. 2] is a schematic drawing showing different grain sizes of dielectric grains in different areas of a section of the laminate.

FIG. 2 is a schematic drawing showing different grain sizes of dielectric grains in a section of the laminate 11 cut in the laminating direction of the laminate 11.

According to one characteristic of the present invention, when $D_1$ represents the average grain size of the dielectric grains present at the outermost layer position $P_1$ in the laminate 11 in the laminating direction, $D_2$ represents the average grain size of the dielectric grains present at the center position $P_2$ in the laminate 11 in the laminating direction and $D_3$ represents the average grain size of the dielectric grains present at the intermediate position $P_3$ equidistant from the outermost layer position $P_1$ and center position $P_2$ in the laminate 11 in the laminating direction, these average grain sizes satisfy at least the following condition:

$$1.5 \times D_1 < D_3 \qquad \text{Mathematical Formula (1)}$$

Preferably these average grain sizes also satisfy the following condition:

$$1.2 \times D_2 < D_3 \qquad \text{Mathematical Formula (2)}$$

Preferably these average grain sizes also satisfy the following condition with respect to Mathematical Formula (2) above:

$$1.5 \times D_2 < D_3 \quad \text{Mathematical Formula (2)'}$$

Here, the center position $P_2$ corresponds to the 50%-penetrated position into the interior of the laminate (internal electrically active layer) 11 in its laminating direction, while the intermediate position $P_3$ corresponds to the 25%-penetrated position into the interior of the laminate (internal electrically active layer) 11 in its laminating direction. Also, the outermost layer position $P_1$ at which the average grain size $D_1$ is measured may be present both on the upper side and lower side of the laminate (internal electrically active layer) 11 or only on one side.

According to Mathematical Formulas (1), (2) and (2)' above, it is understood that the average grain size of the dielectric grains present on both sides and/or at the center of the laminate 11 of the multilayer ceramic capacitor 1 in the laminating direction (area A in FIG. 2) is smaller than the average grain size in the remaining area (area B in FIG. 2). By sintering the laminate while partially suppressing grain growth to achieve such dielectric grain size distribution, drop in CR product associated with any capacity increase of the multilayer ceramic capacitor 1 can be reduced.

Also, more preferably the multilayer ceramic capacitor 1 in the embodiment satisfies the following condition with respect to the average grain size $D_3$ of the dielectric grains present at the intermediate position $P_3$ when $D_4$ represents the average grain size of the dielectric grains present at the outermost edge position $P_4$ in the laminate 11 in the direction orthogonal to the laminating direction:

$$1.5 \times D_4 < D_3 \quad \text{Mathematical Formula (3)}$$

Note that, while the average grain size $D_4$ is not an essential constituent of the present invention because it has limited contribution to the capacitance, it does have significant contribution to the insulation resistance and thus its inclusion helps achieve a greater CR product. Also, it suffices to satisfy the following condition at least:

$$1.2 \times D_4 < D_3 \quad \text{Mathematical Formula (3)'}$$

When the dielectric grains grow excessively due to sintering, the number of grain boundaries in the dielectric layer will decrease and the insulation resistance and voltage endurance will drop as a result. It was found that, with a conventional multilayer ceramic capacitor sintered in a reducing atmosphere, the rate of grain growth is relatively higher near both ends of the laminate in the laminating direction, and also near the center of the laminate, compared to the other parts. The inventors focused on the fact that the one-layer-one-grain structure would manifest first near both ends of the laminate or near the center of the laminate during sintering and that this was a factor of drop in the insulation resistance and also CR product of the capacitor as a whole, and developed the idea of reducing the drop in CR product by suppressing grain growth in locations where the rate (speed) of grain growth is high.

To achieve the dielectric grain size distribution expressed by Mathematical Formula (1) as mentioned above, in an embodiment a grain growth suppression element is added to the covers 15 covering the outside of the laminate 11. This way, the growth of the dielectric grains present near both ends corresponding to the outermost layer positions $P_1$ (area A in FIG. 2) is suppressed more than the growth of the dielectric grains present in the other area (area B in FIG. 2).

Also, to achieve the dielectric grain size distribution expressed by Mathematical Formula (2) or (2)' as mentioned above, in another embodiment the sintering temperature in a reducing atmosphere and holding time at the maximum temperature are adjusted to suppress the growth of the dielectric grains present near the centerline running across the center position $P_2$ in the laminating direction (area A in FIG. 2) more than the growth of the dielectric grains present in the other area (area B in FIG. 2). The effective rate of rise in temperature is approx. 5000 to 10000° C./hr.

Also, to achieve the dielectric grain size distribution expressed by Mathematical Formula (3) or (3)' as mentioned above, in yet another embodiment a grain growth suppression element is added to the side margins 16 covering the outside of the laminate 11. A grain growth suppression element may be added to the side margins 16 and/or a grain growth suppression element may be added to a reverse-pattern sheet 24. This way, the growth of the dielectric grains present near the outermost edge positions $P_4$ (area A in FIG. 2) is suppressed more than is the growth of the dielectric grains present in the other area (area B in FIG. 2).

Figure 3:
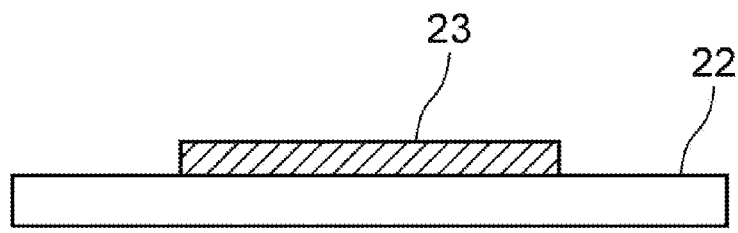
[FIG. 3] is a section view showing one layer of green sheet and one layer of conductive paste film before sintering.
Figure 4:
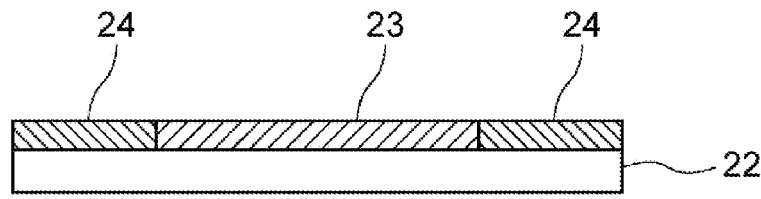
[FIG. 4] is a section view showing one layer of green sheet and one layer of conductive paste film before sintering, with a reverse-pattern sheet formed on/around them.

Here, FIG. 3 is a section view showing one layer of green sheet 22 which will become the dielectric layer 12, and one layer of conductive paste film 23 which will become the internal electrode layer 13, after sintering, respectively. On the other hand, FIG. 4 is a section view showing one layer of green sheet, and one layer of conductive paste film 23, respectively, with the reverse-pattern sheet 24 formed on/around them. The reverse-pattern sheet 24 in FIG. 4 has a reverse pattern with respect to the conductive paste film 23 to compensate for the height difference generating between the green sheet 22 and conductive paste film 23. As with the green sheet 22, the reverse-pattern sheet 24 is made of $BaTiO_3$, for example, as a primary component. The reverse-pattern sheet 24 may be formed on the green sheet 22 by means of screen-printing, or a sheet having an opening corresponding to the internal electrode layer 13 may be laminated on the green sheet 22.

Preferably the grain growth suppression element added to the cover 15, margin 14 and/or reverse-pattern sheet 24 contains at least one type of element selected from a group that includes Mn, Mg, and rare earth elements, for example. The grain growth suppression element may also be contained in the laminate (internal electrically active layer) 11, in which case the content of grain growth suppression element therein is lower than that in the cover 15, margin 14 and/or reverse-pattern sheet 24. Preferably the difference in the added amount of grain growth suppression element is 0.5 mol or more per 100 mol of $BaTiO_3$.

According to this embodiment, the drop in CR product associated with any capacity increase of the multilayer ceramic capacitor 1 can be reduced to a level less than what is experienced with conventional multilayer ceramic capacitors, by suppressing grain growth in the laminate 11 to achieve a dielectric grain size distribution satisfying Mathematical Formulas (1) and (2) or preferably Mathematical Formula (2)', (3) or (3)'.

EXAMPLE

Next, an example of the multilayer ceramic capacitor (hereinafter referred to as "MLCC") proposed by the present invention is explained.

<Preparation of MLCC>

(1) Preparing a Molded MLCC

First, a $BaTiO_3$ powder of 40 nm or more but not more than 400 nm in average grain size was prepared as the material powder for dielectric green sheet, reverse-pattern sheet, cover, and side margin. In this example, Mg and Mn were each added by 1.0 mol per 100 mol of $BaTiO_3$ to the material slurry for the reverse-pattern sheet, cover sheet that will become the cover, and side sheet that will become the side margin. The prepared dielectric material powder was wet-mixed with an organic solvent and applied to a dielectric green sheet of 1.0 μm in thickness using the doctor blade method, after which the sheet was dried. The reverse-pattern sheet, cover sheet, and side sheet were also formed in the same manner.

A conductive paste film containing Ni was screen-printed onto the green sheet according to a specified pattern. Also, a reverse-pattern sheet having a pattern complementing that of the conductive paste film was formed on the green sheet by means of screen-printing in order to eliminate the height difference between the green sheet and conductive paste film. The thickness of the reverse-pattern sheet is the same as that of the conductive paste film. As mentioned above, the aforementioned grain growth suppressant had been added by a specified amount to this reverse-pattern sheet in order to suppress grain growth in the dielectric layer as a result of sintering (refer to Table 1).

One hundred and one green sheets, each having a conductive paste film and reverse-pattern sheet placed on it, were laminated so that the leader sides of the conductive paste films were staggered, to obtain a laminate sheet whose layer number n was 100. Thereafter, multiple cover sheets were pressure-welded on top and bottom of the laminate sheet so as to make the total thickness of the cover to 20 μm. Note that a grain growth suppressant to suppress grain growth in the dielectric layer as a result of sintering had been added by a specified amount to these cover sheets as mentioned above.

Multiple side sheets were pressure-welded on both side faces of a rectangular solid laminate obtained by cutting the laminate sheet to specified dimensions, so as to make the total thickness of the side margin 40 μm. Note that a grain growth suppressant to suppress grain growth in the dielectric layer as a result of sintering had been added by a specified amount as shown in Table 1 to these side sheets as mentioned above. This way, a molded MLCC of 1.0 mm in length, 0.5 mm in width, and 0.5 mm in height was obtained.

(2) Sintering the Molded MLCC

The molded MLCC sample was heated to 300° C. in a $N_2$ atmosphere to remove the binder. Thereafter, the sample was heated in a reducing atmosphere containing $H_2$ at a rate of rise in temperature of 6000° C./hr to a temperature range of 1150° C. to 1250° C., and the achieved temperature was held for 10 minutes to 2 hours. The temperature was lowered, and then raised again to a temperature range of 800° C. to 1050° C. in a $N_2$ atmosphere, and the achieved temperature was held to implement re-oxidization. To form external electrodes on the sintered MLCC compact thus obtained, a Ni paste containing glass frit was applied to both end faces on which the internal electrodes were exposed, and the paste was baked in a $N_2$ atmosphere.

A MLCC sample was thus obtained.

Table 1 shows the manufacturing conditions of the MLCC sample used in this experiment.

TABLE 1

| Group | Sample No. | Grain growth suppressant | Starting $BaTiO_3$ size | Max. temperature and holding time |
|---|---|---|---|---|
| I | 1 | Mg and Mn were | 45 nm | 1150° C., 10 min |
|   | 2 | each added by 1.0 mol |  | 1150° C., 20 min |
|   | 3 | per 100 mol of |  | 1150° C., 30 min |
|   | 4 | $BaTiO_3$ to both the |  | 1150° C., 40 min |
| II | 5 | cover sheet and | 120 nm | 1200° C., 10 min |
|   | 6 | reverse-pattern sheet. |  | 1200° C., 20 min |
|   | 7 |  |  | 1200° C., 30 min |
|   | 8 |  |  | 1200° C., 40 min |
| III | 9 |  | 300 nm | 1220° C., 20 min |
|   | 10 |  |  | 1220° C., 40 min |
|   | 11 |  |  | 1220° C., 60 min |
| VI | 12 |  | 350 nm | 1220° C., 20 min |
|   | 13 |  |  | 1220° C., 40 min |
|   | 14 |  |  | 1220° C., 60 min |
| V | 15 |  | 400 nm | 1250° C., 20 min |
|   | 16 |  |  | 1250° C., 40 min |
|   | 17 |  |  | 1250° C., 60 min |
|   | 18 |  |  | 1250° C., 120 min |

<MLCC Evaluation Method>

(1) Evaluation Method for Average Dielectric Grain Size

The MLCC was cut in parallel with its end faces on which the external electrodes were formed to expose a section, and a photograph of the section of the dielectric layer captured by a scanning electron microscope (SEM) was used to measure the sizes of dielectric grains. Grain size was measured at four positions including the outermost layer position $P_1$ in the laminating direction in order to evaluate the average grain size $D_1$, center position $P_2$ in the laminating direction in order to evaluate the average grain size $D_2$, intermediate position $P_3$ equidistant from the outermost layer position $P_1$ and center position $P_2$ in order to evaluate the average grain size $D_3$, and outermost edge position $P_4$ in the direction orthogonal to the laminating direction in order to evaluate the average grain size $D_4$.

Figure 5:
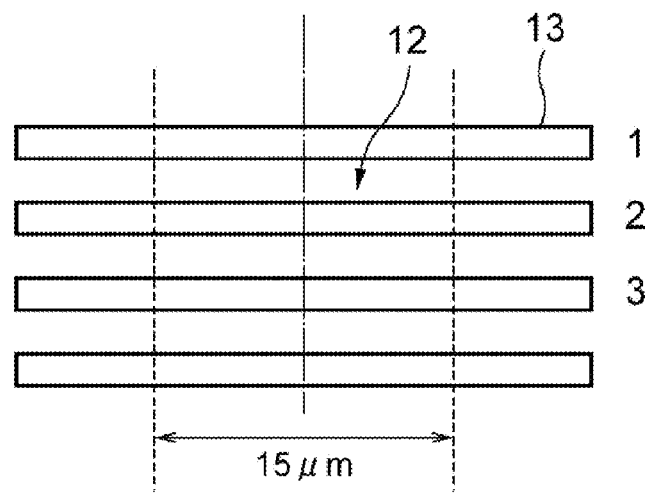
[FIG. 5] is a schematic view of the outermost layer part of the laminate.
Figure 6:
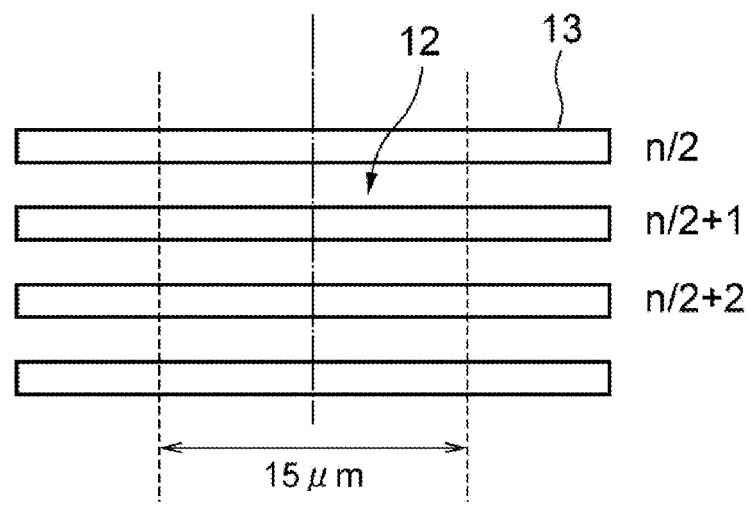
[FIG. 6] is a schematic view of the part penetrated into the laminate by 50% (50%-penetrated part).
Figure 7:
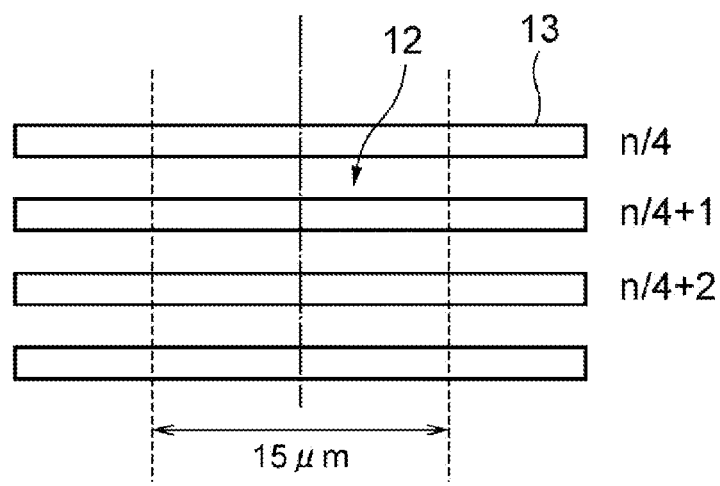
[FIG. 7] is a schematic view of the part penetrated into the laminate by 25% (25%-penetrated part).

Here, at the outermost layer position $P_1$, the sizes of dielectric grains observed in the area of 15 μm from the centerline were measured in the first (outermost) through third dielectric layers 12, as shown in FIG. 5. At the center position $P_2$ corresponding to the 50%-penetrated part into the laminate, the sizes of dielectric grains observed in the area of 15 μm from the centerline were measured in the n/2th through n/2+2th dielectric layers 12 (50th through 52nd layers in the case of n=100), as shown in FIG. 6. At the intermediate position $P_3$ corresponding to the 25%-penetrated part into the laminate, the sizes of dielectric grains observed in the area of 15 μm from the centerline were measured in the n/4th through n/4+2th dielectric layers 12 (25th through 27th layers in the case of n=100), as shown in FIG. 7. At the outermost edge position $P_4$, the sizes of dielectric grains observed in the area of 2 μm toward the center from the end of the internal electrode layer were measured (refer to FIG. 9).

Figure 8:
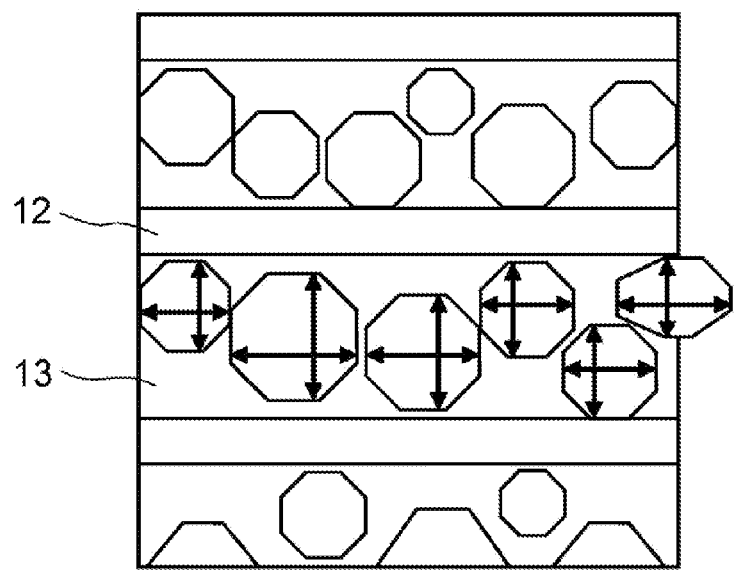
[FIG. 8] is a schematic section view showing an enlarged view of the interior of the laminate for the explanation of average grain size.
Figure 9:
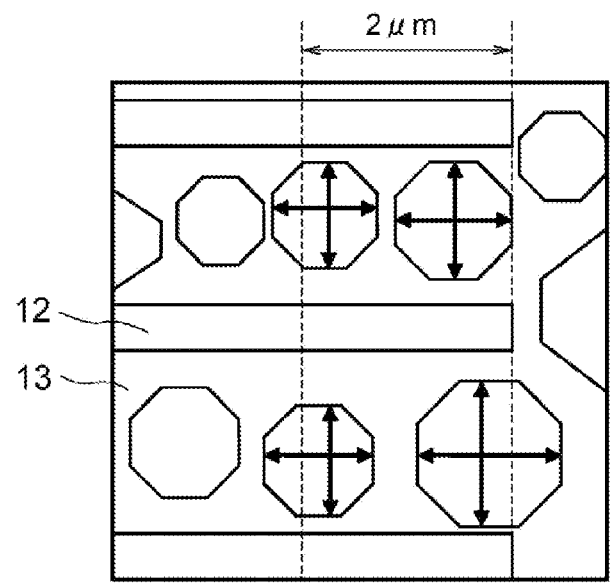
[FIG. 9] is a schematic section view showing an enlarged view of the electrode-side end of the laminate for the explanation of average grain size.

Based on the SEM image, the maximum length of each dielectric grain in the laminating direction, and its maximum length in the direction orthogonal to the laminating direction, were measured. The simple arithmetic mean of these maximum lengths was then evaluated as the size of the dielectric grain. The sizes of all dielectric grains present in the areas defined for positions $P_1$, $P_2$, $P_3$ and $P_4$ were measured, and their simple arithmetic mean was obtained. The final averages measured on 20 MLCC chips manufactured under the same conditions were evaluated as the average grains sizes $D_1$, $D_2$, $D_3$, and $D_4$ in this example. As shown in FIGS. 8 and 9, those grains present on the area border, including the portions outside the area, were included in the target of grain size measurement.

Note that the average grain size $D_1$ may be measured at both of the outermost layer positions on top and bottom of the laminate, or only at one outermost layer position. The average grain size $D_3$ may be measured at both of the 25%-penetrated positions into the laminate from the top and bottom, or only at one 25%-penetrated position into the laminate. The average grain size $D_4$ may be measured at both of the outermost edge positions on the left and right of the laminate, or only at one outermost edge position.

<MLCC Evaluation Results>

The evaluation results of the dielectric layers of prepared MLCCs are shown in Table 2. A CR product of 2000 F·Ω was defined as a specified value and any prepared sample whose CR product was equal to or greater than this value was considered acceptable.

TABLE 2

| Group | A | B | C | D | E | F | G | H | I | J |
|---|---|---|---|---|---|---|---|---|---|---|
| I | 1* | 0.8 | 46 | 48 | 56 | 48 | 1.2 | 1.2 | 1.2 | 1100 |
|  | 2 | 0.8 | 48 | 52 | 78 | 58 | 1.6 | 1.5 | 1.3 | 2200 |
|  | 3 | 0.8 | 48 | 49 | 107 | 51 | 2.2 | 2.2 | 2.1 | 3700 |
|  | 4 | 0.8 | 48 | 49 | 172 | 59 | 3.6 | 3.5 | 2.9 | 4000 |
| II | 5* | 0.8 | 141 | 157 | 194 | 169 | 1.4 | 1.2 | 1.1 | 1800 |
|  | 6 | 0.8 | 118 | 155 | 218 | 144 | 1.8 | 1.4 | 1.5 | 2400 |
|  | 7 | 0.8 | 135 | 146 | 351 | 143 | 2.6 | 2.4 | 2.5 | 3300 |
|  | 8 | 0.8 | 143 | 162 | 548 | 163 | 3.8 | 3.4 | 3.4 | 3400 |
| III | 9* | 0.8 | 329 | 381 | 440 | 361 | 1.3 | 1.2 | 1.2 | 1200 |
|  | 10 | 0.8 | 316 | 351 | 567 | 322 | 1.8 | 1.6 | 1.8 | 2500 |
|  | 11 | 0.8 | 326 | 335 | 628 | 340 | 1.9 | 1.9 | 1.8 | 2600 |
| VI | 12* | 0.8 | 396 | 447 | 548 | 444 | 1.4 | 1.2 | 1.2 | 1000 |
|  | 13 | 0.8 | 382 | 451 | 666 | 473 | 1.7 | 1.5 | 1.4 | 2000 |
|  | 14 | 0.8 | 368 | 443 | 730 | 529 | 2.0 | 1.6 | 1.4 | 2300 |
| V | 15* | 0.8 | 408 | 425 | 583 | 424 | 1.4 | 1.4 | 1.4 | 600 |
|  | 16* | 0.8 | 410 | 418 | 656 | 434 | 1.6 | 1.6 | 1.5 | 900 |
|  | 17* | 0.8 | 443 | 456 | 809 | 493 | 1.8 | 1.8 | 1.6 | 880 |
|  | 18* | 0.8 | 425 | 459 | 928 | 517 | 2.2 | 2.0 | 1.8 | — |

A: Sample No.;
B: Dielectric layer thickness (μm);
C: Average grain size D1 (nm);
D: Average grain size D2 (nm);
E: Average grain size D3 (nm);
F: Average grain size D4 (nm);
G: Grain size ratio D3/D1;
H: Grain size ratio D3/D2;
I: Grain size ratio D3/D4;
J: CR product (F · Ω)

In Table 2, the samples denoted by a number with * (Nos. 1, 5, 9, 12, 15 to 18) are comparative examples resulting in a CR product smaller than 2000 F·Ω. With the samples whose CR product was greater than 2000 F·Ω, the first average grain size ratio $D_3/D_1$ was greater than 1.5 and second average grain size ratio $D_3/D_2$ was greater than 1.2. With the samples whose second average grain size ratio $D_3/D_2$ was greater than 1.5 and third average grain size ratio $D_3/D_4$ was greater than 1.5, a CR product greater than 2500 F·Ω was obtained.

Additionally, the CR product was significantly smaller than the specified value on all of Sample Nos. 15 to 18 whose average grain size $D_1$ at the outermost layer position $P_1$, where grain growth was most suppressed, was greater than 400 nm. This suggests that, when the thickness of one dielectric layer is 0.8 μm, the average grain size $D_1$ should preferably be 0.4 μm or less.

Figure 10:
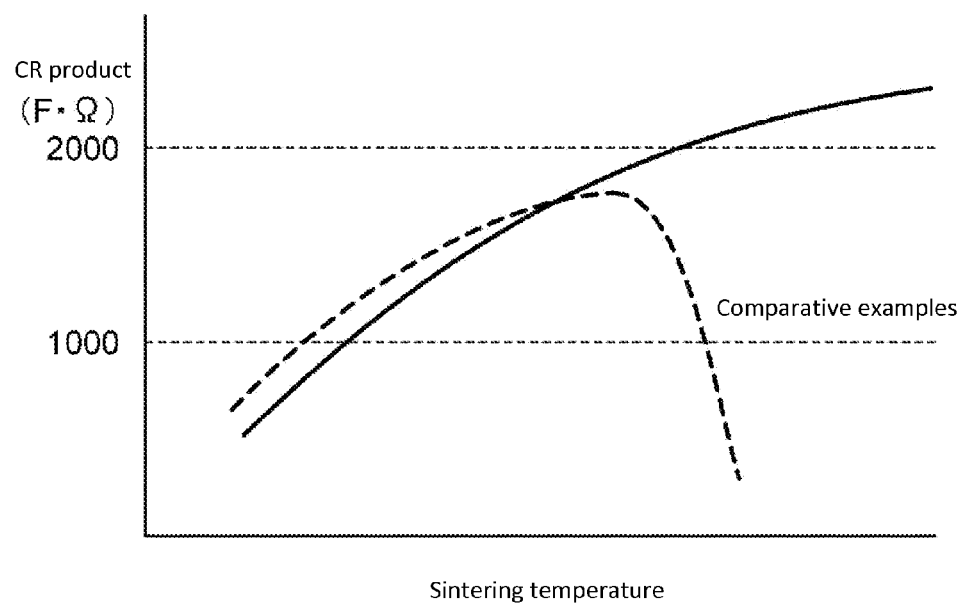
[FIG. 10] is a graph showing the CR product characteristics of the multilayer ceramic capacitors conforming to the present invention vs. those of the comparative examples.

FIG. 10 is a graph showing the qualitative CR product characteristics of the multilayer ceramic capacitors conforming to the present invention vs. those of the comparative examples. The multilayer ceramic capacitors conforming to the present invention as prepared in the example had higher CR products than the comparative examples based on prior art. This means that, even at high sintering temperatures, grain growth was suppressed in the locations of the laminate where the rate of grain growth was high (such as area A shown in FIG. 2) and consequently high insulation resistance was maintained. Also, with the multilayer ceramic capacitors conforming to the present invention as prepared in the example, no disadvantageous characteristics were obtained, such as sudden drop in CR product which occurs at high sintering temperature ranges on MLCCs based on prior art.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, an article "a" or "an" may refer to a species or a genus including multiple species, and "the invention" or "the present invention" may refer to at least one of the embodiments or aspects explicitly, necessarily, or inherently disclosed herein. In this disclosure, any defined meanings do not necessarily exclude ordinary and customary meanings in some embodiments.

The present application claims priority to Japanese Patent Application No. 2013-017078, filed Jan. 31, 2013, the disclosure of which is incorporated herein by reference in its entirety.

It will be understood by those of skill in the art that numerous and various modifications can be made without departing from the spirit of the present invention. Therefore, it should be clearly understood that the forms of the present invention are illustrative only and are not intended to limit the scope of the present invention.

We claim:

1. A multilayer ceramic capacitor with a laminate constituted by dielectric layers alternately laminated with internal electrode layers, said multilayer ceramic capacitor satisfies conditions of $1.5 \times D_1 < D_3$ and $1.2 \times D_2 < D_3$ as relationships of grain sizes $D_1$, $D_2$ and $D_3$, where $D_1$ represents an average grain size of dielectric grains present at an outermost layer position in the laminate in a laminating direction, $D_2$ represents an average grain size of dielectric grains present at a center position in the laminate in the laminating direction, and $D_3$ represents an average grain size of dielectric grains present at an intermediate position equidistant from the outermost layer position and the center position in the laminate in the laminating direction.

2. A multilayer ceramic capacitor according to claim 1, wherein a relationship of average grain sizes $D_2$ and $D_3$ further satisfies a condition of $1.5 \times D_2 < D_3$.

3. A multilayer ceramic capacitor according to claim 1, wherein a relationship of average grain sizes $D_3$ and $D_4$ further satisfies a condition of $1.5 \times D_4 < D_3$, where $D_4$ represents an average grain size of dielectric grains present at an outermost edge position in the laminate in a direction orthogonal to the laminating direction.

4. A multilayer ceramic capacitor according to claim 2, wherein a relationship of average grain sizes $D_3$ and $D_4$ further satisfies a condition of $1.5 \times D_4 < D_3$, where $D_4$ represents an average grain size of dielectric grains present at an outermost edge position in the laminate in a direction orthogonal to the laminating direction.

5. A multilayer ceramic capacitor according to claim 1, wherein a per-layer thickness of the dielectric layer is 0.8 μm, while the average grain size $D_1$ is 0.4 μm or less.

6. A multilayer ceramic capacitor according to claim 2, wherein a per-layer thickness of the dielectric layer is 0.8 μm, while the average grain size $D_1$ is 0.4 μm or less.

7. A multilayer ceramic capacitor according to claim 3, wherein a per-layer thickness of the dielectric layer is 0.8 μm, while the average grain size $D_1$ is 0.4 μm or less.

8. A multilayer ceramic capacitor according to claim 1, wherein a ceramic margin is formed in a manner covering an outside of the laminate, with a grain growth suppressant that suppresses grain growth in the dielectric layer added to the margin.

9. A multilayer ceramic capacitor according to claim 2, wherein a ceramic margin is formed in a manner covering an outside of the laminate, with a grain growth suppressant that suppresses grain growth in the dielectric layer added to the margin.

10. A multilayer ceramic capacitor according to claim 3, wherein a ceramic margin is formed in a manner covering an outside of the laminate, with a grain growth suppressant that suppresses grain growth in the dielectric layer added to the margin.

11. A multilayer ceramic capacitor according to claim 4, wherein a ceramic margin is formed in a manner covering an outside of the laminate, with a grain growth suppressant that suppresses grain growth in the dielectric layer added to the margin.

12. A multilayer ceramic capacitor according to claim 8, wherein the grain growth suppressant that suppresses grain growth in the dielectric layer is added to a reverse-pattern sheet provided to compensate for a height difference generating between the dielectric layer and internal electrode layer.

13. A multilayer ceramic capacitor according to claim 8, wherein the grain growth suppressant contains at least one type of element selected from a group that includes Mn and Mg.

14. A multilayer ceramic capacitor according to claim 12, wherein the grain growth suppressant contains at least one type of element selected from a group that includes Mn and Mg.

\* \* \* \* \*